United States Patent
Deng et al.

(10) Patent No.: US 6,272,550 B1
(45) Date of Patent: Aug. 7, 2001

(54) METHOD AND APPARATUS FOR ACKNOWLEDGING TOP DATA PACKETS

(75) Inventors: Shuang Deng, Sudbury; Robert Olshansky, Wayland, both of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/359,077

(22) Filed: Jul. 22, 1999

Related U.S. Application Data

(63) Continuation of application No. 08/796,251, filed on Feb. 6, 1997, now Pat. No. 5,961,605.

(51) Int. Cl.[7] .............................. G06F 13/00; G06F 15/16
(52) U.S. Cl. ..................... 709/246; 709/232; 709/234
(58) Field of Search .................................... 709/232, 234, 709/237, 246; 710/52, 54, 56, 129; 370/412, 413, 414, 415, 416, 417, 418

(56) References Cited

U.S. PATENT DOCUMENTS

| | | | |
|---|---|---|---|
| 4,914,653 | 4/1990 | Bishop et al. | 370/462 |
| 5,165,021 | 11/1992 | Wu et al. | 709/234 |
| 5,608,870 | 3/1997 | Valiant | 709/246 |
| 5,634,015 | 5/1997 | Chang et al. | 370/412 |
| 5,640,389 | 6/1997 | Masaki et al. | 370/418 |
| 5,758,075 | 5/1998 | Graziano et al. | 370/463 |
| 5,818,845 | 10/1998 | Moura et al. | 370/449 |

OTHER PUBLICATIONS

Robert Olshansky, Moving Toward Low–Cost Access to the Information Highway, Telephony, Nov. 7, 1994, pp. 31–37.
Westell Technologies, World Vision ADSL Asymmetric Digital Subscriber Line, 1996, 37 pages.

*Primary Examiner*—Robert B. Harrell
*Assistant Examiner*—Marc D. Thompson
(74) *Attorney, Agent, or Firm*—Leonard Charles Suchyta; James K. Weixel

(57) ABSTRACT

A data communication network includes a network access unit for coupling one or more computer devices to the network. The network typically has asymmetric upstream and downstream data transmission rates. The network access device implements a method for acknowledging data packets. When a new packet is received by the network access unit from one of the computer devices, the new packet is placed in an outbound queue in the network access unit. When the new packet contains an acknowledgment, previous acknowledgment packets in the outbound queue that have the same source and destination addresses as the new packet are identified and discarded. Remaining packets are transmitted from the outbound queue in the network access unit. By discarding acknowledgment packets in the network access unit, throughput is increased.

8 Claims, 5 Drawing Sheets

METHOD AND APPARATUS FOR ACKNOWLEDGING TOP DATA PACKETS

RELATED PATENTS

The present application is a continuation of prior application Ser. No. 08/796,251 filed on Feb. 6, 1997, now U.S. Pat. No. 5,961,605, for METHOD AND APPARATUS FOR ACKNOWLEDGING TCP DATA PACKETS. The benefit of an earlier filing date under 35 U.S.C §120 is claimed.

FIELD OF THE INVENTION

This invention relates to acknowledgment of data packets in networks having asymmetric upstream and downstream data rates and, more particularly, to methods and apparatus for acknowledging TCP data packets in such networks.

BACKGROUND OF THE INVENTION

The rapid growth of the "information highway" has created the need for high speed, low-cost techniques for transmitting data to and from homes, small businesses, schools, and the like. At the data rates of conventional modems, the transmission of detailed graphics, for example, typically requires a time that may be annoying to the user. A web page containing detailed graphics of 100 kilobytes may require 27 seconds for transmission. Optical fiber networks and CATV networks have sufficient bandwidth to permit high speed data transmission. However, the infrastructure is not presently available to provide data services to consumers on optical fiber or CATV networks on a widespread basis and at low cost.

An asymmetric digital subscriber line (ADSL) standard for data transmission is being developed to address these issues. Data transmission, according to the ADSL standard, permits transmission of simplex and duplex digital signals over the conventional twisted wire pairs that are used for plain old telephone service (POTS). The digital data signals are transmitted at frequencies above the baseband analog POTS band (0–4 kilohertz). The ADSL standard is a physical layer standard providing for a simplex downstream channel at a maximum rate of 6.2 megabits per second and a minimum rate of 1.544 megabits per second. The ADSL standard also includes a duplex digital channel at optional rates of 64 kilobits per second, 160 kilobits per second, 384 kilobits per second and 576 kilobits per second. The ADSL standard takes advantage of the fact that most consumer applications, such as Internet access, access to on-line information services, access to private networks and work-at-home applications, require a larger bandwidth into the home than out of the home. ADSL transport technology is described by R. Olshansky in "Moving Toward Low Cost Access to the Information Highway", *Telephony*, Nov. 7, 1994, pp. 31–37.

Another data service that is designed to take advantage of traffic asymmetry in upstream and downstream directions is the hybrid fiber coax (HFC) network. Telephone and cable companies are designing and constructing HFC networks, typically with a 750 megahertz downstream channel and a 25 to 35 megahertz upstream channel.

The transmission control protocol (TCP) is widely used for various data communication applications, including file transfer (FTP), remote login (telnet) and World-Wide Web (WWW). Data application performance is directly dependent on TCP throughput.

TCP provides reliable data communication by requiring acknowledgment of each data packet. The receiver sends back an acknowledgment packet containing an identifier (sequence number assigned by the sender) of the last byte that it successfully received. The lack of an acknowledgment indicates that either the packet was lost during the transmission or contained corrupted data upon arrival at the receiver. The acknowledgment can be incorporated into a data packet or can be placed in an acknowledgment packet of minimum size that carries no data. The first type of acknowledgment is referred to as a data-carrying acknowledgment packet, and the second as a minimum-size acknowledgment packet.

When TCP data packets arrive at the receiver faster than the acknowledgment packets are sent out, the receiver may use one packet to collectively acknowledge all data packets, instead of generating an acknowledgment for each data packet. This process is referred to as "cumulative acknowledgment."

In prior art networks, the acknowledgment, cumulative or noncumulative, is initiated by the receiver only. Intermediate nodes, such as routers and ADSL access devices, do not participate in the acknowledgment process. They merely forward the acknowledgment packets to the sender of the TCP data packets. However, the receiver is unaware of the asymmetric data channel beyond the local area network (LAN) and generates one acknowledgment packet for each data packet. The acknowledgment packet is sent on the LAN connection to a router. Therefore, cumulative acknowledgment does not occur when the receiver is not directly connected to the asymmetric data channel. The acknowledgment packets must be queued at the router for transmission on the slow upstream link. This causes the TCP throughput to be determined by the slow upstream link, since the sender is required to stop transmission and wait for the acknowledgment to arrive.

It is therefore desirable to eliminate the low throughput transmission of prior art networks and to allow TCP transmission to operate at the full speed of the data channel.

SUMMARY OF THE INVENTION

According to a first aspect of the invention, a method is provided for acknowledging data packets in a data communication network including a network access unit for coupling one or more computer devices to the network. When a new packet is received by the network access unit from one of the computer devices, the new packet is placed in an outbound queue in the network access unit. When the new packet contains an acknowledgment, previous packets in the outbound queue that have the same source and destination addresses as the new packet are identified. Previous acknowledgment packets in the outbound queue which have been identified as having the same source and destination addresses as the new packet are discarded. Packets are then transmitted from the outbound queue in the network access unit. By discarding acknowledgment packets in the network access unit, throughput is increased.

In a first embodiment, minimum-size acknowledgment packets are discarded only when the number of packets in the outbound queue exceeds a predetermined threshold. Minimum-size acknowledgment packets in the outbound queue that are followed by data-carrying packets are discarded. In addition, minimum-size acknowledgment packets at the tail of the outbound queue are merged into a last data-carrying packet in the outbound queue. Acknowledgment packets are merged into the last data-carrying packet by copying information from the new packet into the last data-carrying packet and discarding the new packet. When no data-carrying packets are present in the outbound queue, all packets in the outbound queue except the new packet are discarded.

In a second embodiment, a preceding packet with the same source and destination addresses as the new packet is found in the outbound queue. When the preceding packet in the outbound queue with the same source and destination addresses as the new packet is a data-carrying packet, the new packet is merged into the preceding packet. When the preceding packet in the outbound queue with the same source and destination addresses as the new packet is not a data-carrying packet, the preceding packet is discarded.

According to another aspect of the invention, a network access unit for coupling one or more computer devices to a data communication network is provided. The network access unit comprises means responsive to receipt of a new packet from one of the computer devices for placing the new packet in an outbound queue, means responsive to the new packet containing an acknowledgment for identifying previous packets in the outbound queue that have the same source and destination addresses as the new packet, means for discarding previous acknowledgment packets in the outbound queue which have been identified as having the same source and destination addresses as the new packet and means for transmitting packets from the outbound queue.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
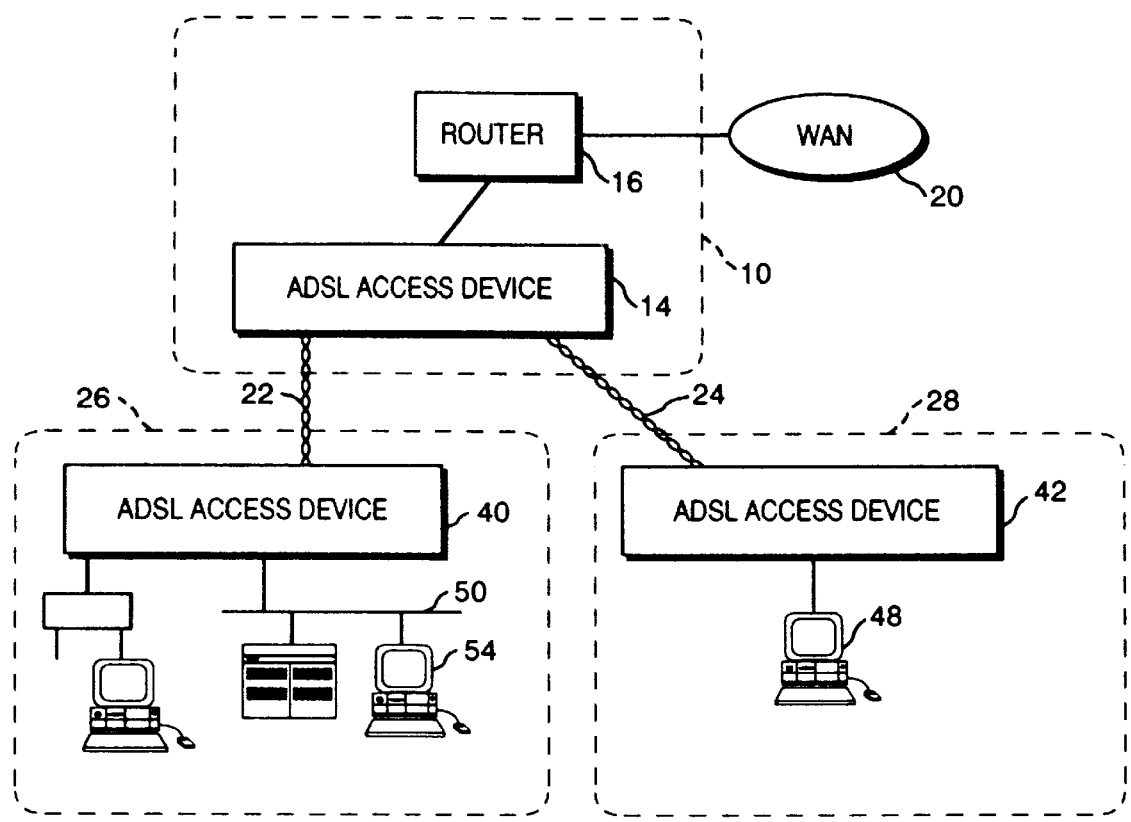
FIG. 1 is a block diagram of a basic ADSL service network.

A block diagram of a basic ADSL service network suitable for incorporation of the present invention is shown in FIG. 1. At a central office 10, an ADSL access device 14 is connected to a router 16, directly or through other intermediate switches such as Ethernet switches or frame relay switches. The router 16 provides access to a wide area network (WAN) 20. The ADSL access device 14 receives and transmits digital data from the wide area network via router 16. The ADSL access device 14 includes a POTS splitter which frequency multiplexes the digital data onto twisted pairs 22 and 24 for transmission outside central office 10 on ADSL channels to customer locations 26 and 28, respectively. The POTS splitter in the central office 10 couples the analog POTS signal to a switch which controls POTS service. The ADSL access device 14 further includes ADSL modems which transmit the digital data in the form of data packets to customer locations 26 and 28 on twisted pairs 22 and 24, respectively, at a selected downstream ADSL transmission rate and which receive data packets transmitted from the customer locations at selected upstream ADSL transmission rates.

Customer location 26 includes an ADSL access device 40, and customer location 28 includes an ADSL access device 42. Each ADSL access device contains a POTS splitter which decouples the analog POTS signal onto the POTS wiring in the home for connection to customer telephone equipment. Each of the ADSL access devices converts the ADSL data signals to appropriate local area network (LAN) format and delivers the converted signals to a workstation, personal computer (PC) 48 or to a local area network 50. The ADSL access device may have a single LAN port (device 42) or multiple LAN ports (device 40).

The ADSL standard for data transmission provides for three simultaneous transport services on twisted pair copper loops. Basic analog telephone service occupies the 0 kHz to 4 kHz band. A high speed simplex channel transmits data downstream from central office 10 to customer locations 26 and 28 at data rates of 1.5 megabits per second to 6.2 megabits per second, depending upon the transmission characteristics of the copper loop and the service option selected by the subscriber. A duplex communication channel varies from 160 kilobits per second to 576 kilobits per second, depending on the characteristics of the loop and the service option selected by the subscriber.

The digital data transmitted between central office 10 and each customer location may utilize conventional Transmission Control Protocol/Internet Protocol (TCP/IP). As indicated above, this protocol requires acknowledgment of each data packet sent. Although workstations, PC's and other devices connected to ADSL access devices 40 and 42 may potentially use cumulative acknowledgment, these devices are unaware of the asymmetrical nature of the ADSL data channel between central office 10 and each customer location. Therefore, these devices send an acknowledgment packet for each data packet received from central office 10. The acknowledgment packets may reduce throughput due to the relatively slow upstream data rate of the ADSL channel. The sender is required to wait until the acknowledgment packets are received.

Figure 2:
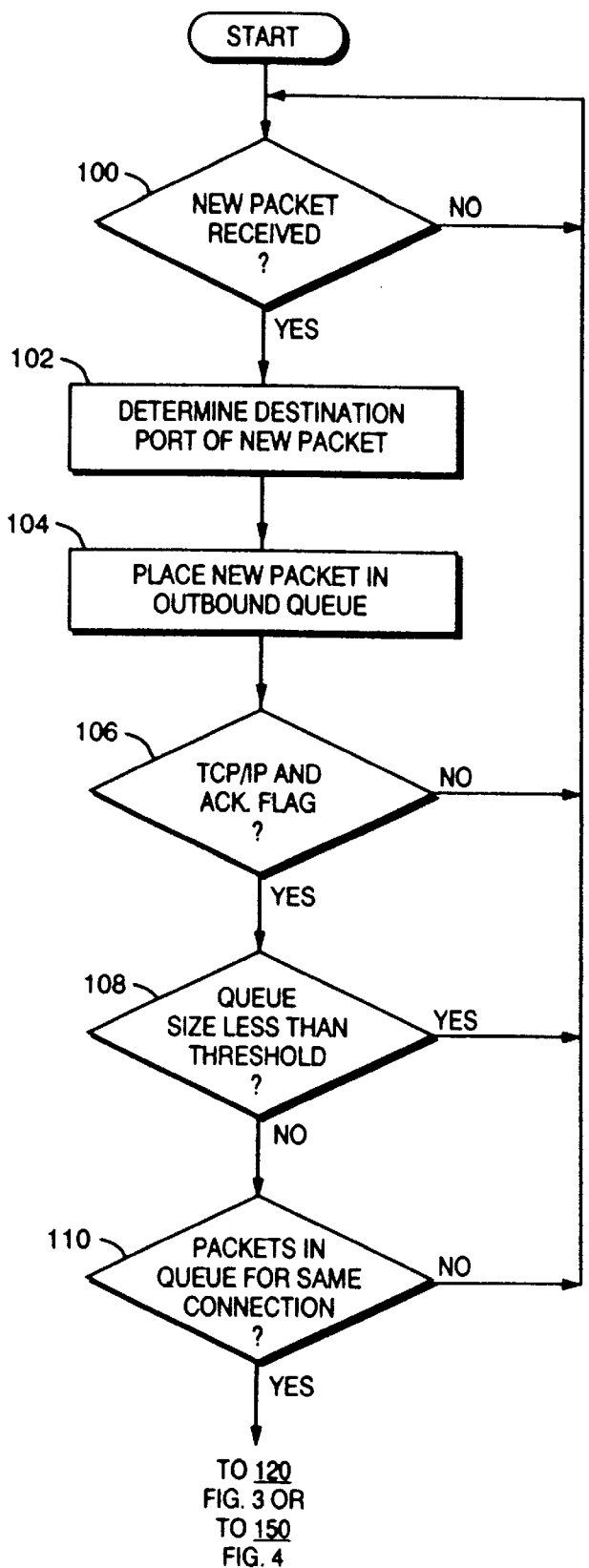
FIGS. 2 and 3 show an example of a process for acknowledging data packets in accordance with the invention.
Figure 3:
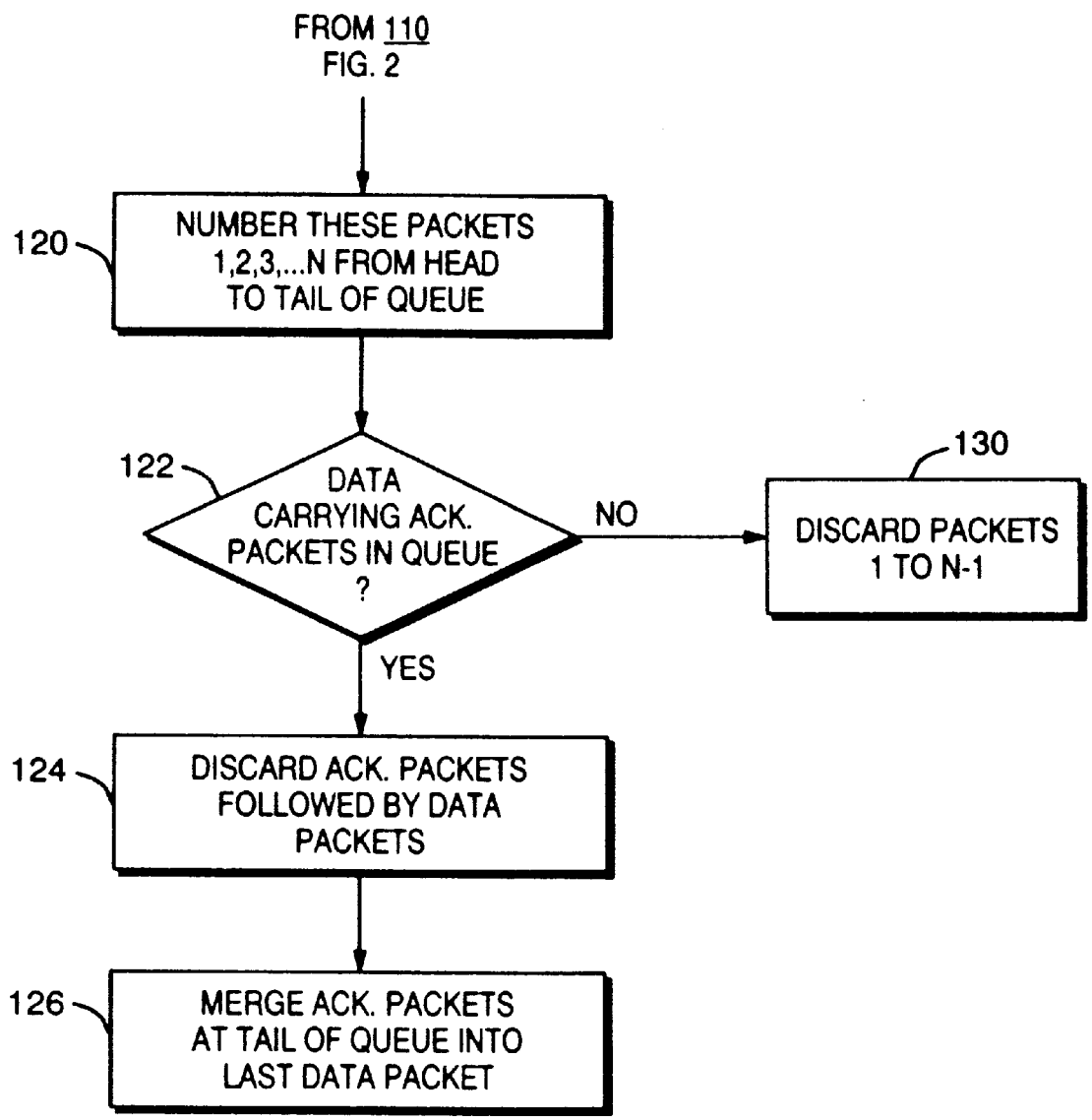

A flowchart of an example of a process for acknowledging data packets in accordance with the invention is shown in FIGS. 2 and 3. The process is implemented by a network access unit, such as the ADSL access devices 40 and 42 shown in FIG. 1, or a conventional network router or bridge. The process is described with reference to the ADSL service network shown in FIG. 1 and described above. Assume that data packets are transmitted from a source in the wide area network 20 to a PC 54 at customer location 26 using TCP/IP protocol. Because the PC 54 is connected to LAN 50, it is unaware of the asymmetric nature of the ADSL channel between customer location 26 and central office 10. Accordingly, the PC 54 provides an acknowledgment for each data packet received from wide area network 20.

In accordance with the invention, the ADSL access device 40 or other network access unit implements a process for acknowledging data packets, an example of which is shown in FIGS. 2 and 3. When a new packet is received from PC 54 in step 100, the destination port of the new packet is determined in step 102. Assuming that the new packet is to be transmitted to the wide area network 20, the packet will be transmitted through the destination port connected to twisted pair 22. The destination port is determined in accordance with conventional router techniques. The new packet is placed in an outbound queue in step 104 for transmission on twisted pair 22. The new packet may be a minimum-size acknowledgment packet or a data-carrying packet with or without an acknowledgment.

As is known in the art, a TCP packet includes a header containing control information and may include data. In step 106, a determination is made whether the protocol type of the new packet complies with the TCP/IP protocol and whether the acknowledgment flag in the TCP header is set. In the TCP protocol, the fourth bit of the 14th byte in the TCP header is the acknowledgment flag. If the new packet is not in compliance with the TCP/IP protocol or the acknowledgment flag is not set, the process exits and waits for a new packet in step 100. When the new packet is in compliance with the TCP/IP protocol and the acknowledgment flag is set, a determination may be made in step 108 whether the size of the outbound queue is less than a predetermined threshold. If the outbound queue contains a small number of packets, the processing overhead required to optimize the upstream transmission of acknowledgments may not be worthwhile. A typical value of the threshold may be about 8. When the size of the queue is less than the predetermined threshold, the process exits and waits for a new packet in step 100. As discussed below, the step of comparing the queue size with a threshold may optionally be omitted, or the threshold may be set to zero.

When the queue size is equal to or greater than the predetermined threshold, a determination is made in step 110 whether additional packets for the same connection as the new packet are present in the outbound queue. Packets having the same connection are those with the same source and destination addresses and the same TCP ports as the new packet. If no packets having the same connection as the new packet are found in the outbound queue in step 110, the process exits and waits for a new packet in step 100.

When additional packets for the same connection are present in the outbound queue, those packets are identified in step 120 as packets 1, 2, 3,... n from the head of the queue to the tail of the queue. In step 122, a determination is made whether any identified packet for the same connection is a data-carrying acknowledgment packet.

Figure 5:
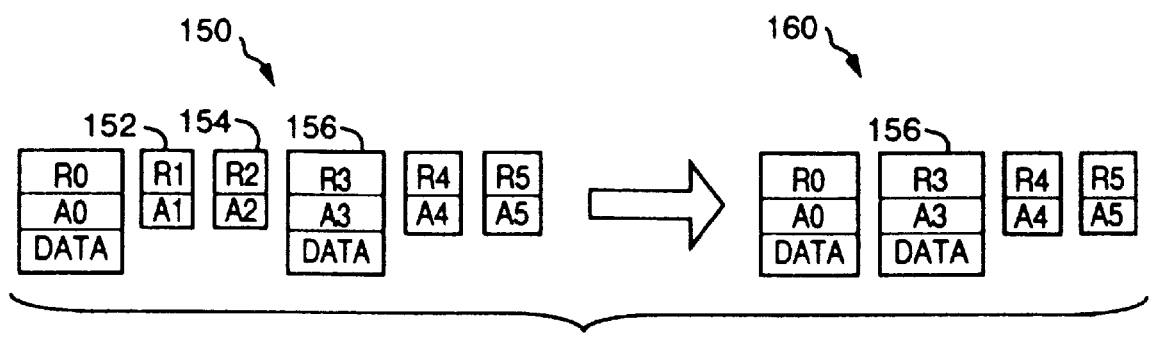
FIG. 5 is a pictorial representation of an outbound queue, showing leading acknowledgment packets being discarded from the queue.
Figure 6:
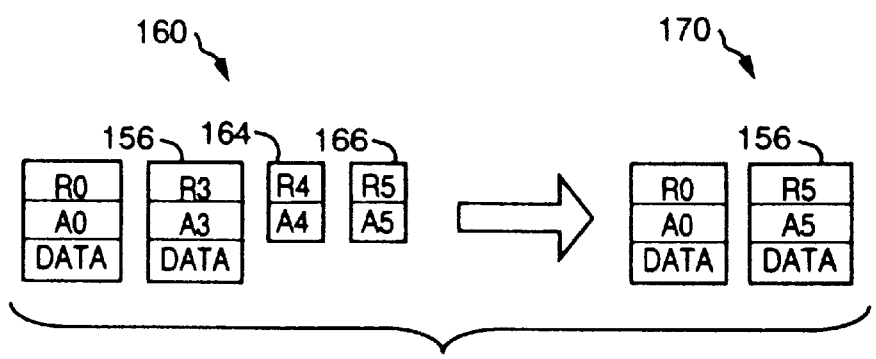
FIG. 6 is a pictorial representation of an outbound queue, showing acknowledgment packets at the tail of the queue being discarded.
Figure 7:
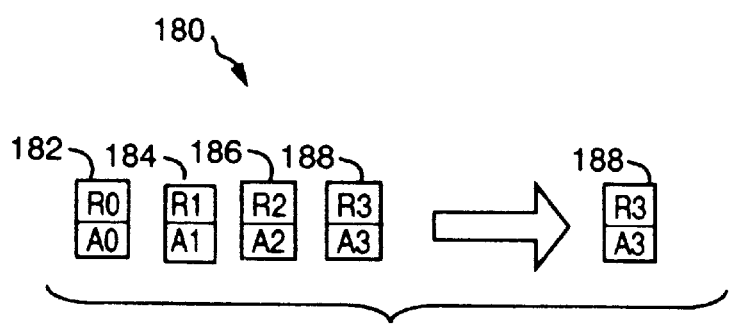
FIG. 7 is a pictorial representation of an outbound queue, showing acknowledgment packets being discarded from the queue.

When one or more data-carrying acknowledgment packets for the same connection are present in the outbound queue, minimum-size acknowledgment packets followed by data-carrying acknowledgment packets are discarded in step 124. Step 124 is described with reference to FIG. 5. An outbound queue 150 includes minimum-size acknowledgment packets 152 and 154 followed by a data-carrying acknowledgment packet 156. In FIGS. 5–7, Ri indicates a sequence number and Ai indicates an acknowledgment number. The sequence number is an identifier assigned by the sender of the packet. In step 124, minimum-size acknowledgment packets 152 and 154 are discarded, because they are followed by data-carrying acknowledgment packet 156, leaving a reduced outbound queue 160.

In step 126, minimum-size acknowledgment packets at the tail of the queue following a data-carrying acknowledgment packet are merged into the data-carrying acknowledgment packet. Step 126 is described with reference to FIG. 6. Reduced outbound queue 160 includes minimum-size acknowledgment packets 164 and 166 following data-carrying acknowledgment packet 156. Acknowledgment packets 164 and 166 are merged into data-carrying acknowledgment packet 156, resulting in a further reduced outbound queue 170, in which only data-carrying acknowledgment packets remain. The merging of minimum-size acknowledgment packets 164 and 166 into data-carrying acknowledgment packet 156 is accomplished by copying the sequence number and acknowledgment fields of the newly-arrived packet 166 into the data-carrying packet 156, setting the control flags of the data-carrying packet 156, if any of the minimum-size acknowledgment packets to be discarded has its flag set, and discarding the minimum-size acknowledgment packets 164 and 166. As shown in FIG. 6, the sequence number R5 and acknowledgment number A5 are copied from minimum-size acknowledgment packet 166 into data-carrying acknowledgment packet 156 in reduced outbound queue 170, and minimum-size acknowledgment packets 164 and 166 are discarded.

When it is determined in step 122 that no data-carrying acknowledgment packets are present in the outbound queue, packets 1 to n-1 are discarded in step 130. As shown in FIG. 7, outbound queue 180 includes minimum-size acknowledgment packets 182, 184, 186 and 188. In accordance with step 130, all minimum-size acknowledgment packets 182, 184, 186 except the last are discarded, thus leaving the newly-arrived minimum-size acknowledgment packet 188 in the outbound queue.

Figure 4:
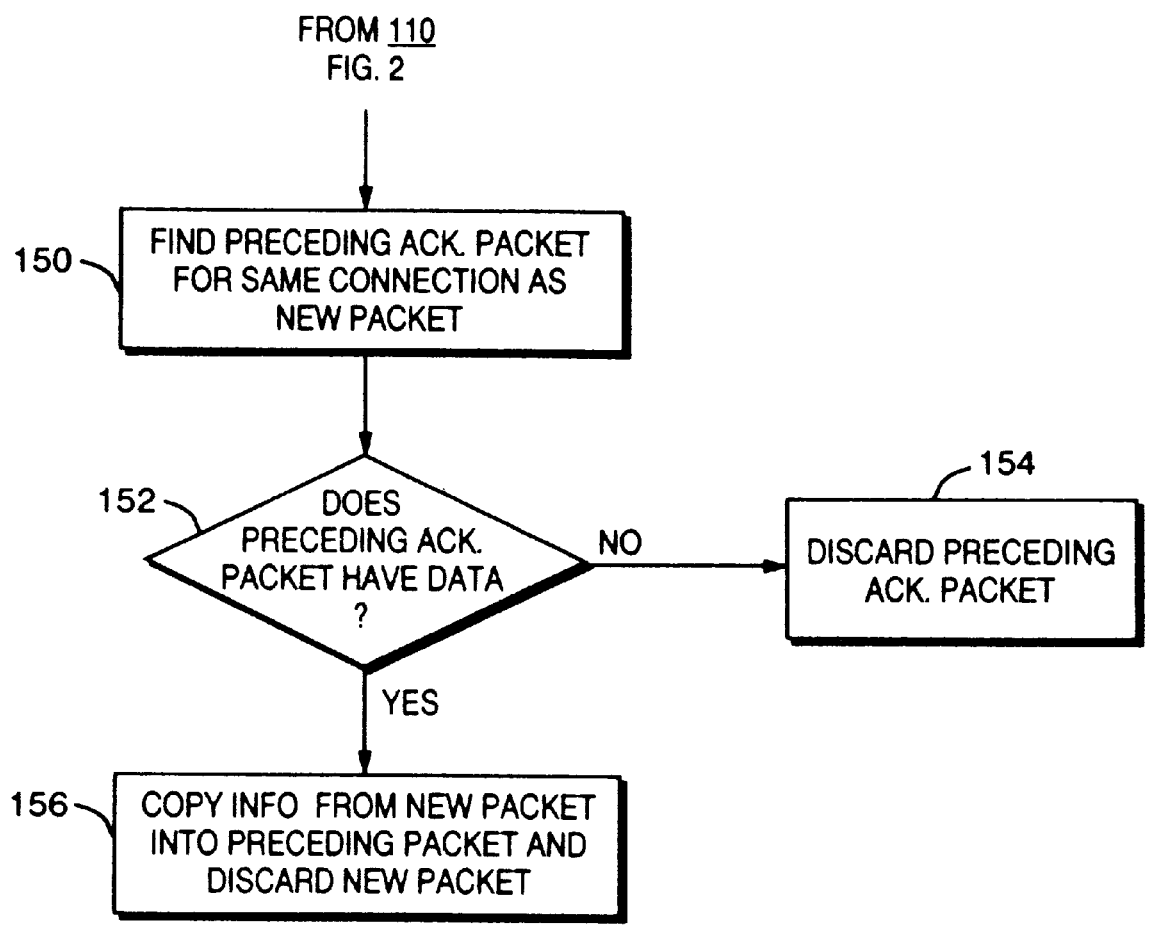
FIG. 4 shows an alternate embodiment of the steps of FIG. 3.

As noted above, comparison of the queue size with a predetermined threshold in step 108 may be omitted or the threshold may be set to zero. In this case, steps 120, 122, 124, 126 and 130 shown in FIG. 3 may be simplified as shown in FIG. 4. Excess minimum-size acknowledgment packets are discarded as they are received, rather than waiting for the outbound queue to reach a predetermined size. In step 150, the preceding acknowledgment packet for the same connection as the newly-arrived packet. if any, is found in the outbound queue. As noted above. packets with the same connection have the same source and destination addresses and the same TCP ports. A determination is made in step 152 whether the preceding acknowledgment packet carries data. When the preceding acknowledgment packet does not carry data, it is discarded in step 154. When the preceding acknowledgment packet does contain data, the newly-arrived packet is merged into the preceding data-carrying packet for the same connection in step 156. This is accomplished by copying the sequence number, acknowledgment and flag fields from the newly-arrived packet into the preceding packet and discarding the newly-arrived packet.

The processes for acknowledging data packets of the present invention have been described in connection with TCP/IP protocol and an ADSL data channel. However, the disclosed processes may be utilized in connection with any protocol that requires acknowledgment of data packets. Furthermore, the process may be used in any type of data channel. The processes are most useful in data channels which have asymmetric upstream and downstream data rates, but are not limited to such data channels. For example, the processes of the present invention reduce acknowledgment traffic even in symmetric data channels. The processes for acknowledging data packets illustrated in FIGS. 2–4 and described above may be implemented as a modification to software executed by a microprocessor in the network access device.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A network access unit for coupling one or more computer devices to a data communication network, comprising:
   a plurality of outbound queues configured to temporarily store packets for transmission on the data communication network;
   a receiver, operatively coupled to one of the computer devices, configured to receive a packet from the one of the computer devices and to place the packet on one of the plurality of outbound queues, the packet having at least a source address and a destination address;

a first threshold unit configured to allow further action if the packet is an acknowledgement packet;

a second threshold unit configured to allow further action if a count of the number of packets on the one of the plurality of outbound queues exceeds a predefined threshold;

a third threshold unit configured to allow further action if the source address and the destination address of the packet are identical to the source and destination address information of at least one of the packets already on the one of the plurality of outbound queues;

a mark unit configured to mark an acknowledgment-only packet on the one of the plurality of outbound queues having source and destination address information identical to the source address and the destination address of the packet;

a discard unit configured to discard marked acknowledgement-only packets on the one of the plurality of outbound queues; and a transmitter configured to transmit remaining temporarily stored packets from the plurality of outbound queues to the data communication network.

2. The network access unit of claim 1 wherein:

the third threshold unit is configured to allow further action if at least one of the packets already on the one of the plurality of outbound queues is a data-carrying packet; and the mark unit is configured to mark acknowledgment-only packets on the one of the plurality of outbound queues having the source and destination address information identical to the source address and the destination address of a following data-carrying packet on the one of the plurality of outbound queues.

3. The network access unit of claim 1 wherein the network access unit comprises a network router.

4. The network access unit of claim 1 wherein the network access unit comprises an asymmetric digital subscriber line (ASDL) access device.

5. The network access unit of claim 1 wherein the packets utilize TCP/IP protocol.

6. A network access unit for coupling one or more computer devices to a data communication network, comprising:

a plurality of outbound queues configured to temporarily store packets for transmission on the data communication network;

a receiver, operatively coupled to one of the computer devices, configured to receive a packet from one of the computer devices and to place the packet on one of the plurality of outbound queues, the packet having at least a source address and a destination address;

a first threshold unit configured to allow further action if the packet is an acknowledgement packet;

a second threshold unit configured to allow further action if a count of the number of packets on the one of the plurality of outbound queues exceeds a predefined threshold;

a third threshold unit configured to allow further action if the source address and the destination address of the packet are identical to the source and destination address information of at least one of the packets already on the one of the plurality of outbound queues;

a mark unit configured to mark an acknowledgment-only packet on the one of the plurality of outbound queues having source and destination address information identical to the source address and the destination address of the packet;

a discard unit configured to discard marked acknowledgement-only packets on the one of the plurality of outbound queues;

a merge unit configured to merge acknowledgment-only packets having source and destination address information identical to the source address and destination address of a data-carrying packet on the one of the plurality of outbound queues into the data-carrying packet; and a transmitter configured to transmit remaining temporarily stored packets from the plurality of outbound queues to the data communication network.

7. A network access unit of claim 6 wherein the merge unit comprises a copy unit, the copy unit configured to copy information from the acknowledgment-only packet on the one of a plurality of outbound queues into an end data-carrying packet before the discard unit discards the packet on the one of a plurality of outbound queues.

8. A destination queue management device for a network access unit operating in a data communications network comprising:

a plurality of destination queues configured to temporarily store packets;

a receiver configured to receive a packet from one of a plurality of sources and place the packet on a destination queue, the packet having at least a source address and a destination address;

a decision unit, configured to allow further operation if the packet is an acknowledgment packet and the count of packets on the destination queue exceeds a predefined threshold;

a tagging unit, configured to tag acknowledgment packets already on the destination queue having a same source address and destination address as the packet; and a discard unit configured to discard at least one of the tagged acknowledgment packets.

* * * * *